United States Patent
Goldschmidt et al.

(10) Patent No.: US 10,186,703 B2
(45) Date of Patent: Jan. 22, 2019

(54) BATTERY TERMINAL CONNECTOR

(71) Applicant: TYCO ELECTRONICS BRASIL LTDA., Braganca Paulista (BR)

(72) Inventors: Jose Roberto Goldschmidt, Campinas (BR); Amadeu Luiz Fazani Cavallieri, Campinas-SP (BR)

(73) Assignee: TE CONNECTIVITY BRASIL INDUSTRIA DE ELECTRONICOS LTDA., Sao Paulo (BR)

( * ) Notice: Subject to any disclaimer, the term of this patent is extended or adjusted under 35 U.S.C. 154(b) by 139 days.

(21) Appl. No.: 15/261,259

(22) Filed: Sep. 9, 2016

(65) Prior Publication Data

US 2018/0076437 A1   Mar. 15, 2018

(51) Int. Cl.
| | |
|---|---|
| *H01M 10/12* | (2006.01) |
| *H01M 10/14* | (2006.01) |
| *H01M 10/16* | (2006.01) |
| *H01M 10/18* | (2006.01) |
| *H01M 2/20* | (2006.01) |
| *H01M 2/22* | (2006.01) |
| *H01M 2/24* | (2006.01) |
| *H01M 2/26* | (2006.01) |
| *H01M 2/28* | (2006.01) |
| *H01M 2/30* | (2006.01) |
| *H01R 4/42* | (2006.01) |
| *H01R 43/26* | (2006.01) |

(Continued)

(52) U.S. Cl.
CPC ............... *H01M 2/305* (2013.01); *H01R 4/42* (2013.01); *H01R 11/283* (2013.01); *H01R 13/641* (2013.01); *H01R 43/26* (2013.01); *H01M 2220/20* (2013.01); *H01R 11/286* (2013.01); *H01R 2201/26* (2013.01)

(58) Field of Classification Search
None
See application file for complete search history.

(56) References Cited

U.S. PATENT DOCUMENTS

2013/0316599 A1 * 11/2013 Goldschmidt ....... H01R 11/282
439/782

FOREIGN PATENT DOCUMENTS

| FR | 2953333 A1 | 6/2011 |
| FR | 3026237 A1 | 3/2018 |
| WO | 2013046175 A1 | 4/2013 |

OTHER PUBLICATIONS

International Search Report, International Application No. PCT/IB2017/055440, International Filing Date Sep. 8, 2017.

* cited by examiner

*Primary Examiner* — Yoshitoshi Takeuchi

(57) ABSTRACT

A battery terminal connector for terminating to a battery post of a battery. The battery terminal connector includes a cable attachment portion, a flange portion having a tightening member provided thereon, and a post engaging portion. A guard member is mounted on the flange portion. The guard member is moveable between a first position and a second position. The guard member has a projection which extends over the tightening member when the guard member is in the first position. The projection is removed from the tightening member when the battery terminal connector is properly positioned relative to the battery post and the guard member is in the second position. The battery terminal connector can only be terminated to the battery post when the battery terminal connector is properly positioned relative to the battery post.

18 Claims, 4 Drawing Sheets

(51) Int. Cl.
*H01R 11/28* (2006.01)
*H01R 13/641* (2006.01)

BATTERY TERMINAL CONNECTOR

FIELD OF THE INVENTION

The present invention relates to a battery terminal connector. More particularly, the invention relates to a battery terminal connector which has a guard to prevent the battery terminal connector from being tightened or clamped to a battery post until the battery terminal connector is properly seated on the battery post.

BACKGROUND OF THE INVENTION

Automobile engine compartments contain many components which substantially fill the compartment, making routine maintenance a challenge. One such component is the battery. Batteries typically are extremely heavy and have fixed positive and negative charged locations, often in the form of exterior extending posts for interconnection with corresponding connectors, usually referred to as battery terminals. Conventional battery terminals typically include threaded fasteners that must be actuated to draw the battery terminal into engagement with the corresponding battery post.

Conventional battery terminal connectors provide a secure connection to the battery posts if the connectors are properly positioned and terminated. However, if the battery terminal connectors are not properly positioned on the battery posts, stresses applied to the battery cables and the battery terminal connectors can cause the improper discharge of the batteries, shortening the effective life of the batteries. In addition, improper positioning of the battery terminal connectors on the battery posts can cause the battery terminal connectors to become loose, causing an ineffective connection between the battery terminal connectors and the battery posts.

It would be beneficial to provide a battery terminal connector which cannot be secured to the battery terminal unless the battery terminal connector is properly positioned on the battery terminal.

SUMMARY OF THE INVENTION

An embodiment is directed to a battery terminal connector for terminating to a battery post of a battery. The battery terminal connector includes a cable attachment portion, a flange portion having a tightening member provided thereon and a post engaging portion. A guard member is mounted on the flange portion. The guard member is moveable between a first position and a second position. The guard member has a projection which extends over the tightening member when the guard member is in the first position. The projection is removed from the tightening member when the battery terminal connector is properly positioned relative to the battery post and the guard member is in the second position. The battery terminal connector can only be terminated to the battery post when the battery terminal connector is properly positioned relative to the battery post.

An embodiment is directed to a battery terminal connector for terminating to a battery post of a battery. The battery terminal connector includes a post engaging portion and a flange portion having a guard mount with a guard member receiving opening extending therethrough. A tightening member is provided on the flange portion. A guard member is mounted on the flange portion. The guard member is moveable between a first position and a second position. The guard member has a projection which extends over the tightening member when the guard member is in the first position. The projection is removed from the tightening member when the battery terminal connector is properly positioned relative to the battery post and the guard member is in the second position. The guard member has a post portion with a transition portion and a lower portion. The lower portion extends below the guard member receiving opening and has a battery engaging surface provided at the free end thereof. The transition portion has an outer surface which extends in a spiral configuration. The transition portion is positioned in and cooperates with the guard member receiving opening to move the guard member between the first position and the second position. The battery terminal connector can only be terminated to the battery post when the battery terminal connector is properly positioned relative to the battery post and the guard member is in the second position.

An embodiment is directed to a method of connecting a battery terminal connector to a battery post of a battery. The method includes: inserting the battery terminal connector onto the battery post, the battery terminal connector being in an unclamped position; with continued insertion, engaging a surface of the battery with a portion of a guard member of the battery terminal connector; with continued insertion, rotating the guard member of the battery terminal connector from a first position, in which a projection of the guard member extends over a tightening member, to a second position, in which the projection of the guard member is removed from the tightening member; and tightening the tightening member after the second position is reached to move the battery terminal connector to a clamped position, to position the battery terminal connector in engagement with the battery post.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
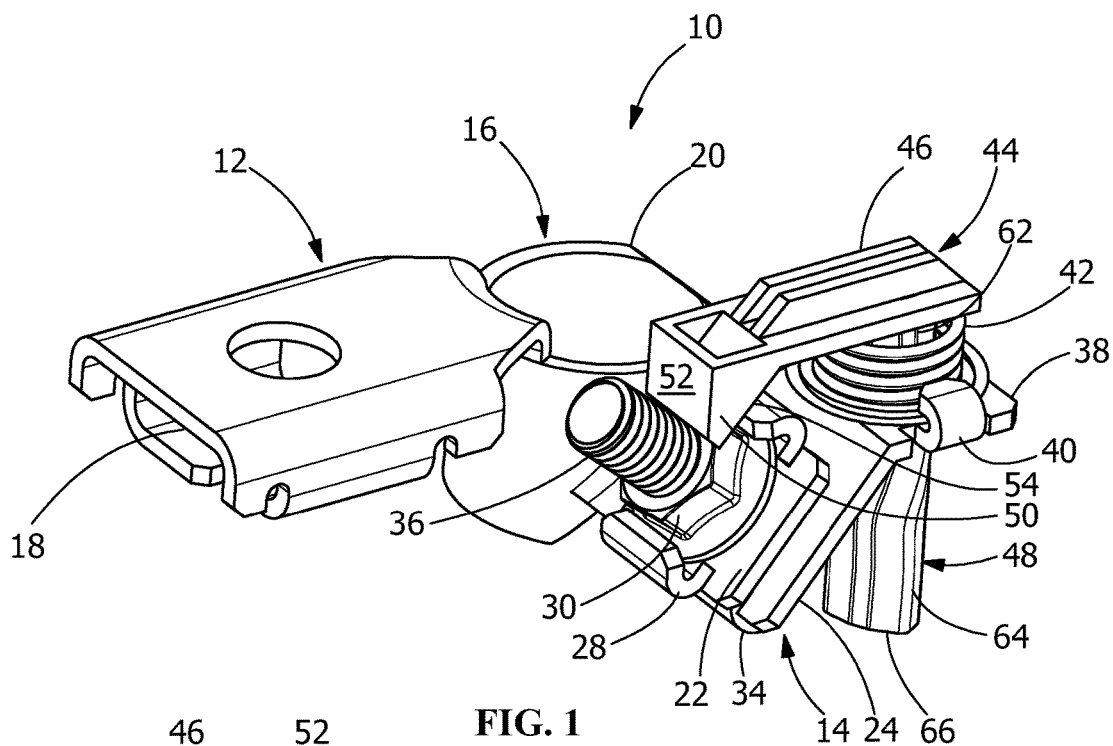
FIG. 1 is a front perspective view of an illustrative embodiment of a battery terminal connector of the present invention, a guard bracket of the battery terminal connector is shown in a first position.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Figure 7:
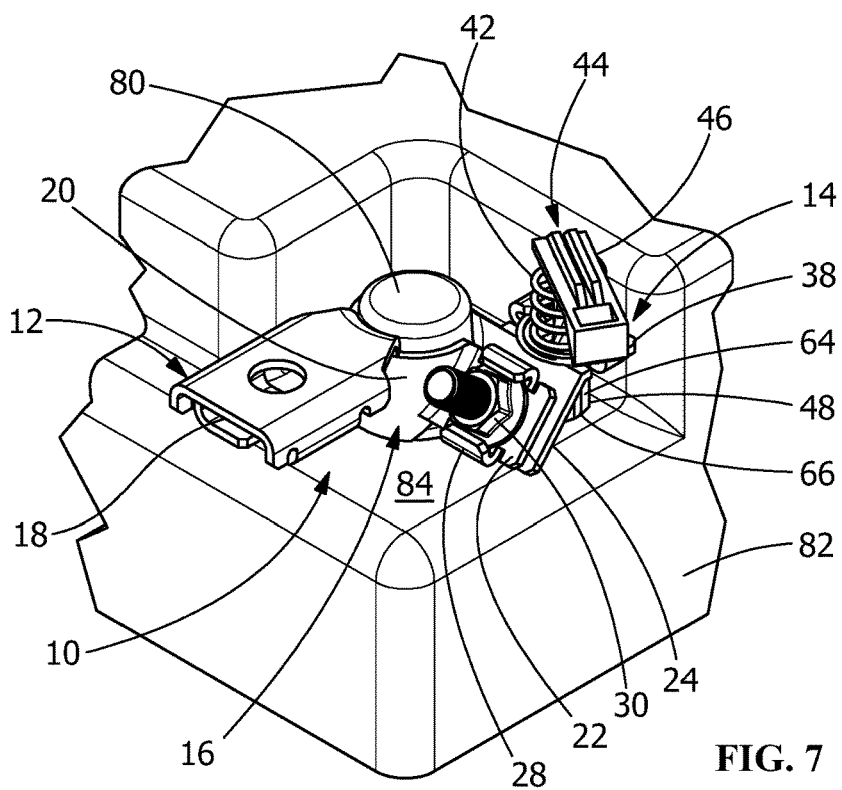
FIG. 7 is a perspective view of the battery terminal connector and the post, illustrating the completed insertion of the battery terminal connector onto the post, whereby the guard bracket is moved from the tightening mechanism to allow a tool to engage the tightening mechanism.

The battery terminal connector 10 provides for an electrical connection or engagement with a battery post 80 of a battery 82 (as best shown in FIG. 7). The battery terminal connector 10, when fully mounted onto the battery post 80 cooperates with the battery post 80 to provide normal force between the battery terminal connector 10 and the battery post 80 to provide and maintain a gas tight electrical connection between the battery terminal connector 10 and the battery post 80 over time.

The term battery post is intended to refer to a protrusion extending from a battery that corresponds to one of the charged, i.e., positive or negative, portions of the battery. In the illustrative embodiment shown, the battery post 80 resembles a tapered or conic segment having an outside surface such that when engaged with an inside surface of a post-engaging portion 16 of the battery terminal connector 10, an electrical connection is formed between the battery terminal connector 10 and the battery post 80. However, other configurations can be used without departing from the scope of the invention.

Figure 2:
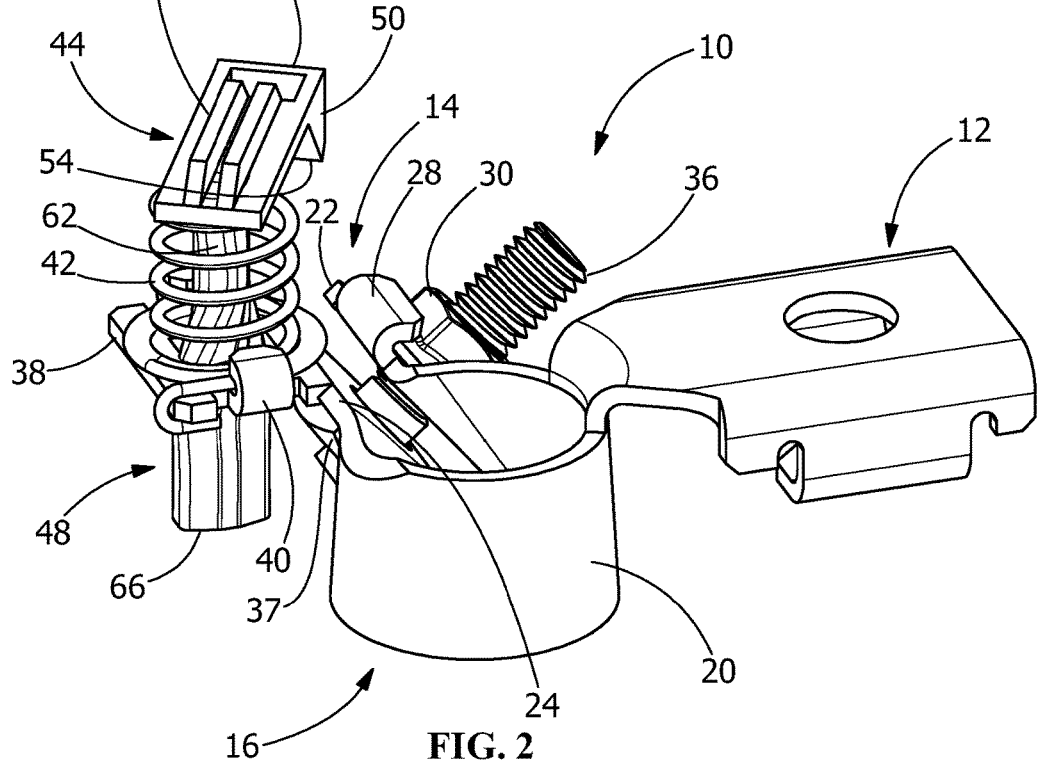
FIG. 2 is a back perspective view of the battery terminal connector of FIG. 1, the guard bracket of the battery terminal connector is shown in a second position.
Figure 3:
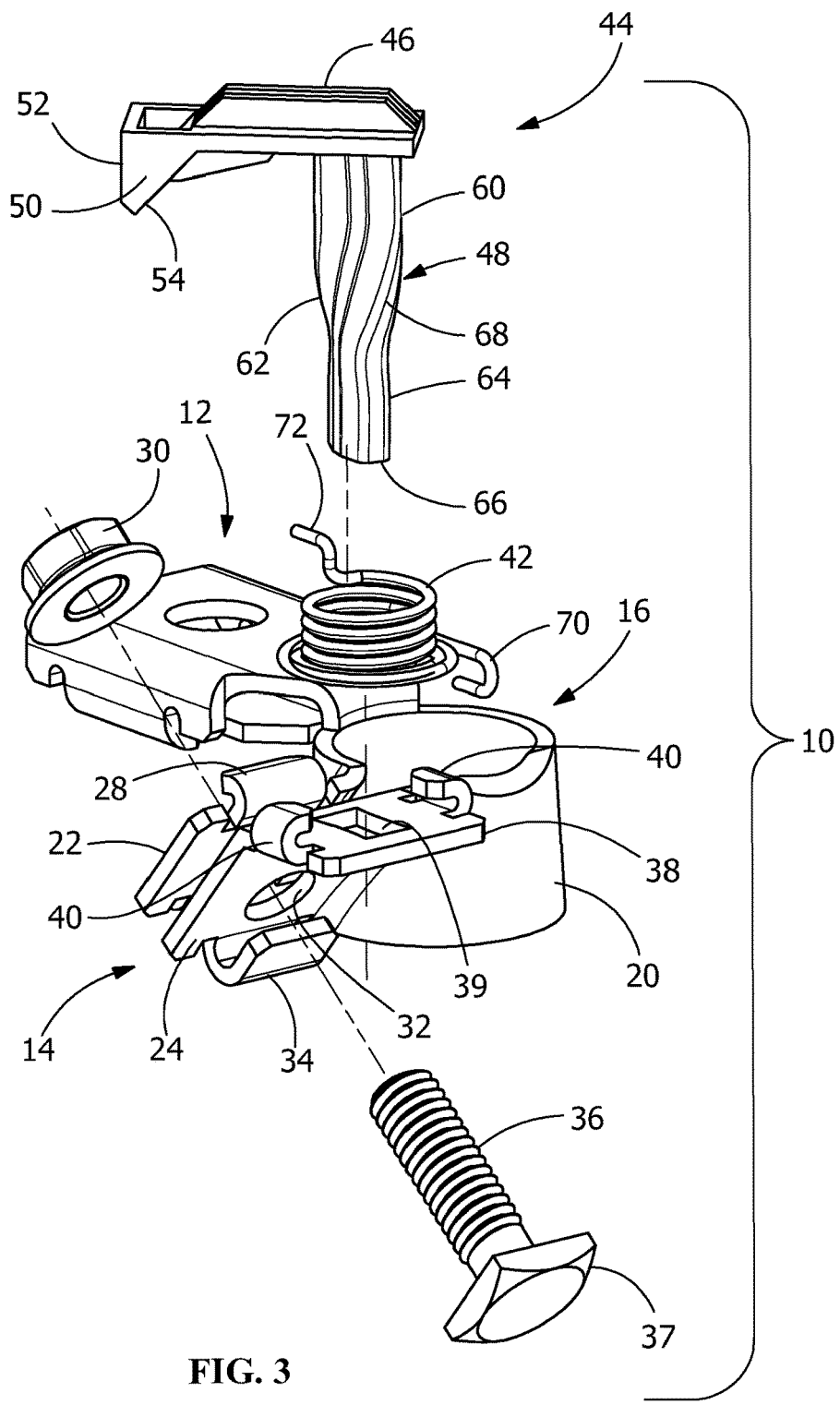
FIG. 3 is an exploded perspective view of the battery terminal connector of FIG. 1.

As best shown in FIGS. 1 through 3, battery terminal connector 10 includes a cable attachment portion 12, flange portion 14 and a post-engaging portion 16. In the embodiment shown, the post engaging portion 16 has as an annular shape, for engaging the battery post 80. To ease installation over the battery post 80, post-engaging portion 16 includes a slightly tapered profile, as best shown in FIG. 2. However, other configurations can be used without departing from the scope of the invention.

Components of the battery terminal connector 10 are made of material of sufficient structural strength and electrical conductivity to effect an electrical connection when engaged with a battery post. Such material includes, but is not limited to, copper alloys or steel alloys. Although the component material is typically electrically conductive, electrically conductive coatings, such as tin or other materials, may also be used.

In the illustrative embodiment shown in FIGS. 1 through 3, cable attachment portion 12 includes an opening or slot 18 (FIG. 1) which receives a component of a battery cable (not shown) to place the battery terminal connector 10 in electrical engagement with the battery cable. Alternately, a feature, such as, but not limited to, a projection or wire barrel may be provided in the cable attachment portion 12 to engage a projection or portion of the battery cable.

The post-engaging portion 16 has a split conic or tubular body 20. The cable attachment portion 12 is attached or formed to the post-engaging portion 16.

The flange portion 14 includes two flange members 22, 24 which extend from free ends of the body 20 of the post-engaging portion 16. The first flange member 22 has a bolt or tightening member receiving opening (not shown) which extends therethrough. One or more tightening member securing arms 28 are provided to cooperate with and maintain tightening member 30 in position relative to the first flange member 22. The tightening member 30 may be, but is not limited to, a nut.

The second flange member 24 has a bolt or tightening member receiving opening 32 which extends therethrough. One or more tightening member securing arms 34 are provided to cooperate with and maintain a tightening member 36 in position relative to the second flange member 24. The tightening member 36 may be, but is not limited to, a bolt.

The first flange member 22 and second flange member 24 are essentially parallel to each other. The tightening member receiving opening of the first flange member 22 is essentially aligned with the tightening member receiving opening 32 of the second flange member 24 to allow tightening member 36 to be inserted therethrough.

The tightening member 36 is inserted through tightening member receiving openings. In this position, a head 37 of the tightening member 36 is held proximate the second flange member 24 by the one or more tightening member securing arms 34. Additionally, the tightening member 30 is threaded onto tightening member 36 and held in position proximate the first flange member 22 by the one or more tightening member securing arms 28. The cooperation of the tightening member securing arms 28, 34 with the tightening members 30, 36 prevents the tightening members 30, 36 from being dislodged from the flange members 22, 24, thereby preventing loose components in the engine compartment.

A guard mount 38 extends from the second flange member 24. In the illustrative embodiment shown, the guard mount 38 extends from the second flange member 24 at an angle of between 90 degrees and 180 degrees. The guard mount 38 has a guard member receiving opening 39 which extends therethrough. One or more spring or resilient member securing arms 40 are provided to cooperate with and maintain a resilient member 42 in position relative to the second flange member 24 and the guard mount 38. The resilient member 42 may be, but is not limited to, a spring.

As best shown in FIG. 3, a guard member 44 cooperates with the guard member receiving opening 39. The guard member 44 has a top portion 46 and a post portion 48 which extend essentially perpendicular to the top portion 46. The top portion has projection 50 proximate an end 52 thereof. The projection 50 extends downward from the top portion 46 a sufficient distance allowing the projection 50 to be positioned in front of tightening member 30 when the guard member 44 is a first position, as will be more fully described. An angled surface 54 may be provided on projection 50 to allow the projection 50 to be positioned proximate to, but not in engagement with, the first flange member 22 or the tightening member 30.

The post portion 48 has an upper portion 60, a transition portion 62 and a lower portion 64. With the guard member 44 properly positioned relative to the guard mount 38, the upper portion 60 extends above the guard member receiving opening 39 and through the resilient member 42. The lower portion 64 extends below the guard member receiving opening 39. The lower portion 64 has a battery engaging surface 66 provided at the free end thereof. The transition portion 62 extends between the upper portion 60 and the lower portion 64. The transition portion 62 is positioned in and cooperates with the guard member receiving opening 39, as will be more fully described. The transition portion 62 has an outer surface or ribs 68 which extend in a spiral configuration from the upper portion 60 to the lower portion 64.

In the embodiment shown, the resilient member 42 is a coiled spring which as a curved portion 70 provided at one end and a jogged portion 72 provided at the opposite end. The curved portion 70 is dimensioned to receive the guard mount 38 to prevent the curved portion 70 from moving relative to the guard mount 38. The jogged portion 72 is mounted in a spring receiving recess (not shown) of the top portion 46 of the guard member 44 to prevent the jogged portion 72 from moving relative to the top portion 46.

Figure 4:
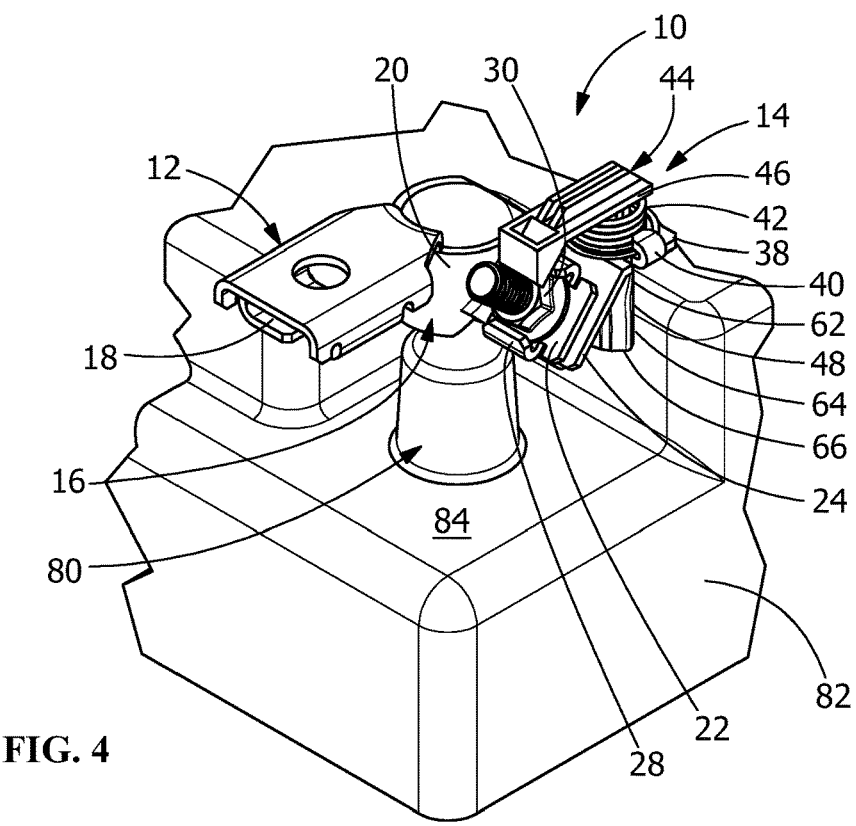
FIG. 4 is a perspective view of the battery terminal connector of FIG. 1 prior to being inserted onto a post of a battery.

The operation of the battery terminal connector 10 is illustrated in FIGS. 4 through 7. With the battery terminal connector 10 in a first or open or unclamped position, the battery terminal connector 10 is positioned proximate the battery terminal post 80, as shown in FIG. 4. In this position, the tightening member 30 is inserted onto tightening member 36, but is not fully tightened, allowing the first flange member 22 to be spaced from the second flange member 24. In this position, the inside diameter of the post-engaging portion 16 is larger than the diameter of the post, thereby allowing the post-engaging portion 16 to be easily inserted onto the post 18 or removed from the post 18 as needed. In this first or open position, the projection 50 of the guard member 44 is positioned over a portion of the tightening member 30, thereby preventing a tool from being applied to the tightening member 30. As a tool cannot be applied to the tightening member 30, the tightening member 30 and the battery terminal connector 10 cannot be moved to a closed or clamped position.

Figure 5:
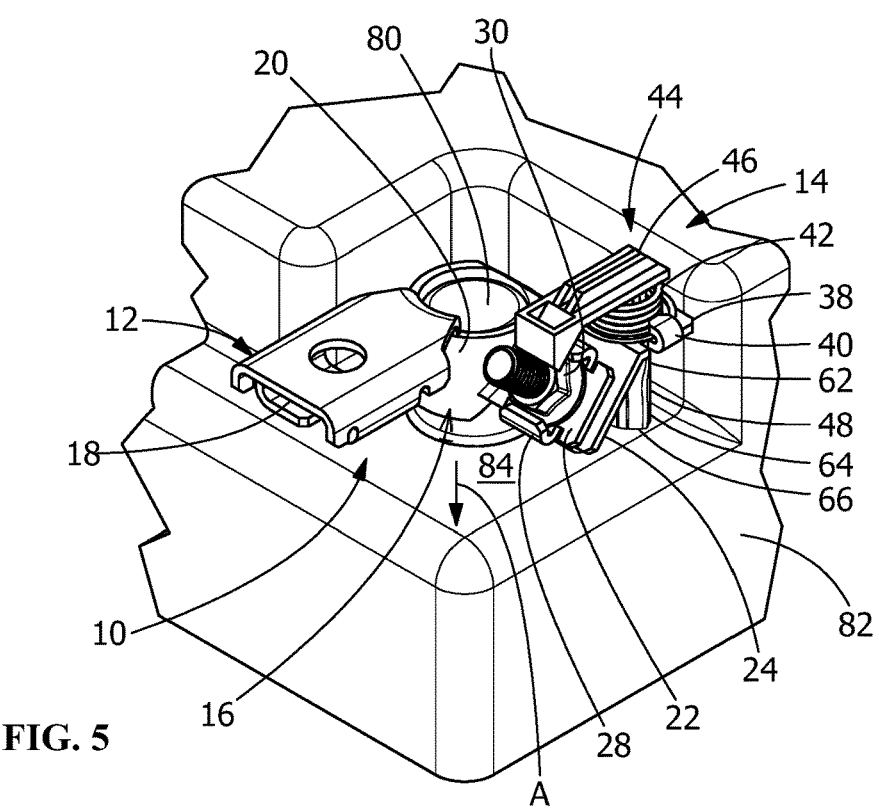
FIG. 5 is a perspective view of the battery terminal connector and the post, illustrating the initial insertion of the battery terminal connector onto the post, whereby a surface of the guard bracket contacts a surface of the battery.
Figure 6:
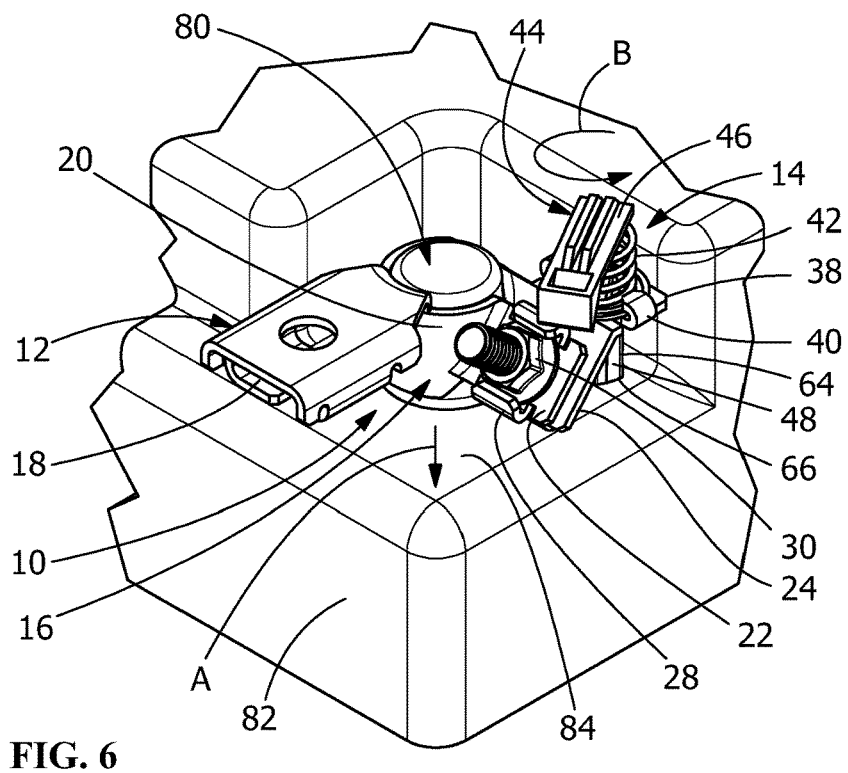
FIG. 6 is a perspective view of the battery terminal connector and the post, illustrating the continued insertion of the battery terminal connector onto the post, whereby the guard bracket is rotated relative to the tightening mechanism.

The battery terminal connector 10 is inserted downward onto post 80 as shown in FIGS. 5 through 7, in the direction of arrow A (FIGS. 5 and 6). As this occurs, the battery engaging surface 66 engages a top surface 84 of the battery 82, as shown in FIG. 5. As the downward insertion of the battery terminal connector 10 onto post 80 continues, the guard member 44 is prevented from further downward movement due to the engagement of surface 66 of the guard member 44 with the surface 84 of the battery 82. The engagement of the surfaces 66, 84 causes the flange portion 14, including the guard mount 38, to move relative to the guard member 44 as insertion of the connector 10 onto the post 80 continues. As this occurs, the resilient member 42 is moved from an unstressed position to a stressed position.

As the battery terminal connector 10 is moved downward, the outer surface 68 of the transition portion 62 of the guard member 44 engages the walls of the guard mount receiving opening 39 of the guard mount 38. As the outer surface 68 has a spiral configuration, the moving engagement of the outer surface 68 with the opening 39 causes the post portion 48, and the entire guard member 44 to rotate as illustrated by the arrow B (FIG. 6). This rotation causes the projection 50 of the guard member 44 to move from the first position, in which the projection 50 is positioned over a portion of the tightening member 30 (as shown in FIGS. 4 and 5), through an intermediate position, in which the projection 50 is positioned partially over a portion of the tightening member 30 (as shown in FIG. 6), to a second position, in which the projection 50 is not positioned over a portion of the tightening member 30 (as shown in FIG. 7). In the illustrative embodiment shown, the post portion 48 and projection 50 are rotated approximately 45 degrees or more from the first position to the second position.

In the first and intermediate position, a tool is prevented from being applied to the tightening member 30, thereby preventing the tightening of the tightening member 30, which in turn prevents the battery terminal connector 10 from being moved to a closed or clamped position, preventing the termination of the battery terminal connector 10 to the post 80 of the battery 82.

In the second position, the projection 50 is removed from the tightening member 30, allowing a tool to be applied to the tightening member 30, thereby allowing the tightening of the tightening member 30, which in turn allows the battery terminal connector 10 to be moved to a closed position, allowing the proper termination of the battery terminal connector 10 to the post 80 of the battery 82.

The second position, in which the projection 50 is removed from the tightening member 30, is only reached when the battery terminal connector 10 is properly positioned relative to the battery post 80. In the clamped position, the inside surface of the split body 20 of the post-engaging portion 16 is reduced to tighten about the post 18. The use of the tightening member 30 creates a gradient force which causes the post-engaging portion 16 to provide secure clamping engagement about the post 80. The tightening member 30 also creates a controlled, specific and repeatable force which causes a specific movement or deformation of the post-engaging portion 16, which in turn provides a controlled, specific and repeatable electrical connection between the battery terminal connector 10 and the post 80.

As the post-engaging portion 16 is moved from unclamped position to the clamped position, the split body 20 is subjected to a tensile force, as the diameter of the post-engaging portion 16 cannot be reduced beyond the diameter of the solid battery post 80. The split body 20 is configured to elastically deform while not exceeding the yield strength of the material when the post-engaging portion 16 is moved to the clamped position, thereby providing a stable gas tight electrical contact interface between the post-engaging portion 16 and the post 80 over the required life cycle of the battery terminal.

If the battery terminal connector 10 is removed from the post 80, the process recited above is reversed. As the battery terminal connector 10 is moved away from the battery 82, the battery engaging surface 66 is retracted from the battery surface 84. As this occurs, the resilient member 42 is allowed to return toward its unstressed position, causing the outer surface 68 of the transition portion 62 of the guard member 44 to again movingly engage the walls of the guard mount receiving opening 39 of the guard mount 38. The spiral outer surface 68 cooperates with the opening 39 to cause the post portion 48, and the entire guard member 44 to rotate from the second position shown in FIG. 7 back to the first position shown in FIG. 4 in which the projection 50 is positioned over a portion of the tightening member 30, thereby preventing a tool from being applied to the tightening member 30. As a tool cannot be applied to the tightening member 30, the tightening member 30 and the battery terminal connector 10 cannot be moved to the closed or clamped position.

The present invention thus allows only for the clamping of the battery terminal connector to the battery post when the battery terminal connector is properly positioned relative to the battery post. This ensures that a proper electrical connection will be effected between the battery terminal connector and the battery post at the proper height, thereby eliminating stresses on the battery post. This greatly reduces or eliminates the possibility that the battery terminal connector will make an improper or less than optimal connection with the battery post.

As the battery terminal connector of the present invention is designed to preferably terminate a battery cable to the post of a battery, two battery terminal connectors may be used with a single battery to allow for connection to a positive post and a negative post (which has a different diameter from the positive battery post). One battery terminal connector would be for the positive post which has a first size and the other battery terminal connector would be for the negative post which has a second size different from the first size. In these instances, the battery terminal of the present invention may also be color coded to indicate which size and which terminal is to be used with each connector.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A battery terminal connector for terminating to a battery post of a battery, the battery terminal connector comprising:
a cable attachment portion;
a flange portion having a tightening member provided thereon;
a post engaging portion;
a guard member mounted on the flange portion, the guard member being moveable between a first position and a second position, the guard member having a projection which extends over the tightening member when the guard member is in the first position to prevent movement of the tightening member, the projection being removed from the tightening member to provide access to the tightening member to allow the movement of the tightening member when the battery terminal connector is fully inserted onto the battery post of the battery and the guard member is in the second position;
wherein the battery terminal connector can only be terminated to the battery post when the battery terminal connector is fully inserted onto the battery post of the battery.

2. The battery terminal connector as recited in claim 1, wherein the flange portion includes two flange members which extend from the post-engaging portion.

3. The battery terminal connector as recited in claim 2, wherein the first flange member has one or more first tightening member securing arms which cooperate with and maintain the tightening member in position relative to the first flange member.

4. The battery terminal connector as recited in claim 3, wherein the second flange member has one or more second tightening member securing arms which cooperate with and maintain a second tightening member in position relative to the second flange member.

5. The battery terminal connector as recited in claim 2, wherein a guard mount extends from the second flange member, the guard mount has a guard member receiving opening which extends therethrough.

6. The battery terminal connector as recited in claim 5, wherein the guard member cooperates with the guard member receiving opening, the guard member has a top portion and a post portion which extend essentially perpendicular to the top portion.

7. The battery terminal connector as recited in claim 6, wherein the projection extends downward from the top portion a sufficient distance allowing the projection to be positioned in front of the tightening member when the guard member is in the first position.

8. The battery terminal connector as recited in claim 7, wherein an angled surface is provided on the projection to allow the projection to be positioned proximate to, but not in engagement with, the first flange member or the tightening member.

9. The battery terminal connector as recited in claim 6, wherein the post portion has an upper portion, a transition portion and a lower portion, the lower portion extends below the guard member receiving opening, the lower portion has a battery engaging surface provided at the free end thereof, the transition portion extends between the upper portion and the lower portion, the transition portion is positioned in and cooperates with the guard member receiving opening, the transition portion has an outer surface which extends in a spiral configuration from the upper portion to the lower portion.

10. The battery terminal connector as recited in claim 6, wherein one or more resilient member securing arms are provided on the guard mount to cooperate with and maintain a resilient member in position relative to the guard mount.

11. The battery terminal connector as recited in claim 10, wherein the resilient member is a coiled spring which has a curved portion provided at one end and a jogged portion provided at the opposite end, the curved portion dimensioned to receive the guard mount to prevent the curved portion from moving relative to the guard mount, the jogged portion is mounted in the top portion of the guard member to prevent the jogged portion from moving relative to the top portion.

12. A battery terminal connector for terminating to a battery post of a battery, the battery terminal connector comprising:
a flange portion having a guard mount with a guard member receiving opening extending therethrough;

a tightening member provided on the flange portion;
a post engaging portion;
a guard member mounted on the flange portion, the guard member being moveable between a first position and a second position, the guard member having a projection which extends over the tightening member when the guard member is in the first position, the projection being removed from the tightening member when the battery terminal connector is fully inserted onto the battery post of the battery and the guard member is in the second position, the guard member having a post portion, the post portion having a transition portion and a lower portion, the lower portion extending below the guard member receiving opening, the lower portion having a battery engaging surface provided at the free end thereof, the transition portion having an outer surface which extends in a spiral configuration, the transition portion positioned in and cooperating with the guard member receiving opening to move the guard member between the first position and the second position;
wherein the battery terminal connector can only be terminated to the battery post when the battery terminal connector is fully inserted onto the battery post of the battery and the guard member is in the second position.

13. The battery terminal connector as recited in claim 12, wherein the guard member has a top portion which extend essentially perpendicular to the post portion, the projection extends downward from the top portion a sufficient distance allowing the projection to be positioned in front of the tightening member when the guard member is in the first position.

14. The battery terminal connector as recited in claim 13, wherein an angled surface is provided on the projection to allow the projection to be positioned proximate to, but not in engagement with, the first flange member or the tightening member.

15. The battery terminal connector as recited in claim 12, wherein one or more resilient member securing arms are provided on the guard mount to cooperate with and maintain a resilient member in position relative to the guard mount, the resilient member is a coiled spring which has a curved portion provided at one end and a jogged portion provided at the opposite end, the curved portion dimensioned to receive the guard mount to prevent the curved portion from moving relative to the guard mount, the jogged portion is mounted in the guard member to prevent the jogged portion from moving relative to the guard member.

16. The battery terminal connector as recited in claim 12, wherein the flange portion includes two flange members which extend from the post-engaging portion.

17. The battery terminal connector as recited in claim 16, wherein the first flange member has one or more first tightening member securing arms which cooperate with and maintain the tightening member in position relative to the first flange member.

18. The battery terminal connector as recited in claim 17, wherein the second flange member has one or more second tightening member securing arms which cooperate with and maintain a second tightening member in position relative to the second flange member.

* * * * *